(12) United States Patent
Karram et al.

(10) Patent No.: US 11,274,692 B2
(45) Date of Patent: Mar. 15, 2022

(54) SELF-TAPPING COMPRESSION LIMITER

(71) Applicant: GM Global Technology Operations LLC, Detroit, MI (US)

(72) Inventors: Michael A. Karram, Burton, MI (US); Terrence J. Christensen, Franklin, NC (US)

(73) Assignee: GM Global Technology Operations LLC, Detroit, MI (US)

( * ) Notice: Subject to any disclaimer, the term of this patent is extended or adjusted under 35 U.S.C. 154(b) by 251 days.

(21) Appl. No.: 16/431,157

(22) Filed: Jun. 4, 2019

(65) Prior Publication Data
US 2020/0386257 A1 Dec. 10, 2020

(51) Int. Cl.
*F16B 31/02* (2006.01)
*F16B 5/02* (2006.01)
*F16B 41/00* (2006.01)

(52) U.S. Cl.
CPC .............. *F16B 31/02* (2013.01); *F16B 5/025* (2013.01); *F16B 41/002* (2013.01)

(58) Field of Classification Search
CPC ........ F16B 5/025; F16B 25/00; F16B 25/103; F16B 31/02; F16B 33/02; F16B 35/041; F16B 41/002; F22B 7/16; B62B 5/005; B62D 65/00
USPC ......... 411/1, 381–382, 386, 387.4, 411, 424; 180/11
See application file for complete search history.

(56) References Cited

U.S. PATENT DOCUMENTS

| | | | | |
|---|---|---|---|---|
| 502,827 A * | 8/1893 | Nixon | ....................... | F22B 7/16 411/379 |
| 731,983 A * | 6/1903 | Vauclain | .................. | F22B 7/16 411/379 |
| 2,823,574 A * | 2/1958 | Rosan | ................. | F16B 25/0078 411/386 |
| 3,513,896 A * | 5/1970 | Neuschotz | .............. | F16B 39/06 411/110 |
| 4,818,165 A * | 4/1989 | Shirai | ................. | F16B 25/0021 411/178 |
| 6,619,888 B2 * | 9/2003 | Calandra, Jr. | ............ | B21K 1/70 405/259.6 |
| 8,764,365 B2 * | 7/2014 | Roessner | .............. | F16B 37/125 411/395 |
| 2003/0077142 A1* | 4/2003 | Stone | .................... | F16B 5/0233 411/107 |
| 2005/0025566 A1* | 2/2005 | Hasegawa | ............. | F16B 5/0233 403/408.1 |
| 2005/0053449 A1* | 3/2005 | Grubert | ................. | F16B 37/067 411/546 |
| 2007/0009341 A1* | 1/2007 | Nagayama | .............. | F16B 33/02 411/432 |

(Continued)

*Primary Examiner* — Roberta S Delisle
(74) *Attorney, Agent, or Firm* — Vivacqua Crane PLLC

(57) ABSTRACT

A self-tapping compression limiter for a structure of an automotive vehicle. The limiter includes a body having a first end extending to a second end. The body has a bore formed through the first and second ends defining a longitudinal axis. The body has an outer wall having a shoulder radially extending from the outer wall and formed adjacent one of the first and second ends to reduce tolerance to the structure. The outer wall has a threaded portion formed about the longitudinal axis. The threaded portion is matingly cooperable with the structure to provide a positive lock interface between the limiter and the structure.

20 Claims, 2 Drawing Sheets

(56) References Cited

U.S. PATENT DOCUMENTS

2014/0154539 A1* 6/2014 Kwok ................ H01M 10/643
                                                    429/82
2015/0139749 A1* 5/2015 Metten ................ F16B 41/002
                                                    411/114

* cited by examiner

SELF-TAPPING COMPRESSION LIMITER

INTRODUCTION

The present disclosure relates to devices used to facilitate fastening a first workpiece to a second workpiece where the workpieces may include different materials. More particularly, the present disclosure relates to self-tapping compression limiters for an assembly in a motor vehicle.

Fastening members with compression limiters are widely used to join materials of different properties to one another including applications such as fastening plastic parts to metal components or parts of an automobile vehicle assembly. However, challenges exist in the current technology. For example, incorporation of a springing flange into the design of a sleeve requires additional machining to achieve the springing function with the required clearance to permit the flange to deflect during fastener assembly. A fastener itself may be needed to be specially machined or formed having a protruding shank rib member to prevent the fastener from releasing from the sleeve assembly prior to installation, thereby increasing costs.

Moreover, plastic components used with a metal component, e.g. a vehicle engine block, may experience thermal cycling over time. As a result, the stress/strain over time may generate deformation or creep of the plastic component, losing connection with the metal component.

Thus, while current compression limiters may achieve their intended purpose, there is a need for a new and improved compression limiter.

SUMMARY

According to several aspects, a self-tapping compression limiter for a structure of an automotive vehicle is provided. The limiter comprises a body having a first end extending to a second end. The body has a bore formed through the first and second ends defining a longitudinal axis. The body further has an outer wall having a shoulder radially extending from the outer wall to a contact portion configured to contact the structure. The body has an outer wall having a shoulder radially extending from the outer wall and is formed adjacent one of the first and second ends to reduce tolerance to the structure. The outer wall has a threaded portion formed about the longitudinal axis. The threaded portion is matingly cooperable with the structure to provide a positive lock interface between the limiter and the structure.

In one embodiment, outer wall comprises a first shaped drive formed at one of the first and second ends allowing torque to be applied to the limiter. In this embodiment, the first shaped drive is a male hex drive.

In another embodiment, the inner wall comprises a second shaped drive formed at one of the first and second ends allowing torque to be applied to the limiter. In this embodiment, the second shaped drive is a female hex drive.

In another aspect, an automotive assembly with self-tapping compression is provided. The assembly includes a structure having a flange with a first side and an opposing second side. The flange has a first bore formed through the first and second sides defining an internal wall having internal threads formed thereon.

The assembly further includes a limiter having a body. The body has a first end extending to a second end. The body further has a second bore formed through the first and second ends defining a longitudinal axis. The body further has an outer wall having a shoulder radially extending from the outer wall to a contact portion configured to contact the first side of the structure. The shoulder is formed adjacent one of the first and second ends to reduce tolerance to the structure. The outer wall has a threaded portion formed about the longitudinal axis. The threaded portion of the outer wall and the internal threads of the internal wall are matingly cooperable to provide a positive lock interface between the limiter and the structure.

In this aspect, the outer wall comprises a first shaped drive formed at one of the first end and second end to allow torque to be applied to the limiter. In this embodiment, the first shaped drive is a male hex drive.

In another embodiment, the inner wall comprises a second shaped drive formed at one of the first and second ends to allow torque to be applied to the limiter. The second shaped drive is a female hex drive. The internal wall comprises an internal diameter. The shoulder comprises an outer diameter greater than the internal diameter.

In yet another aspect, a vehicle having an automotive assembly with self-tapping compression is provided. The vehicle comprises a chassis and a body supported by the chassis. The body includes a motor compartment and an occupant zone. The vehicle further includes an automotive assembly with self-tapping compression disposed in the motor compartment.

The assembly comprises a structure having a flange with a first side and an opposing second side. The flange has a first bore formed through the first and second sides defining an internal wall having internal threads formed thereon. The assembly further comprises a limiter having a body. The body has a first end extending to a second end. The body further has a second bore formed through the first and second ends defining a longitudinal axis. The body also has an outer wall having a shoulder radially extending from the outer wall. The shoulder is formed adjacent one of the first and second ends to interface with one of the first and second sides of the flange for reduced tolerance to the structure. The outer wall has a threaded portion formed about the longitudinal axis. The threaded portion of the outer wall and the internal threads of the internal wall are matingly cooperable to provide a positive lock interface between the limiter and the structure.

In this aspect, the outer wall comprises a first shaped drive formed at one of the first end and second end to allow torque to be applied to the limiter. In this embodiment, the first shaped drive is a male hex drive.

In another embodiment, the inner wall comprises a second shaped drive formed at one of the first and second end to allow torque to be applied to the limiter. In this embodiment, the second shaped drive is a female hex drive. The internal wall comprises an internal diameter. The shoulder has an outer diameter greater than the internal diameter.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

In accordance with embodiments of the present disclosure, a self-tapping compression limiter for a structure of an automotive vehicle is provided. The embodiments of the present disclosure provide an improved interface connection between a vehicle part or component that may be plastic or polymeric and a vehicle component that may be metal or metallic. In accordance with the embodiments, the components are interfaced with a compression limiter with self-tapping threads.

In turn, the embodiments of the compression limiter reduce system tolerance variation of assemblies, reduce packaging space, increase bolt clamp load retention, maintain bolt clamp load transfer between the vehicle components, minimize plastic deformation of plastic vehicle components, reduce gravity loading, and reduce tool damage.

Figure 1:
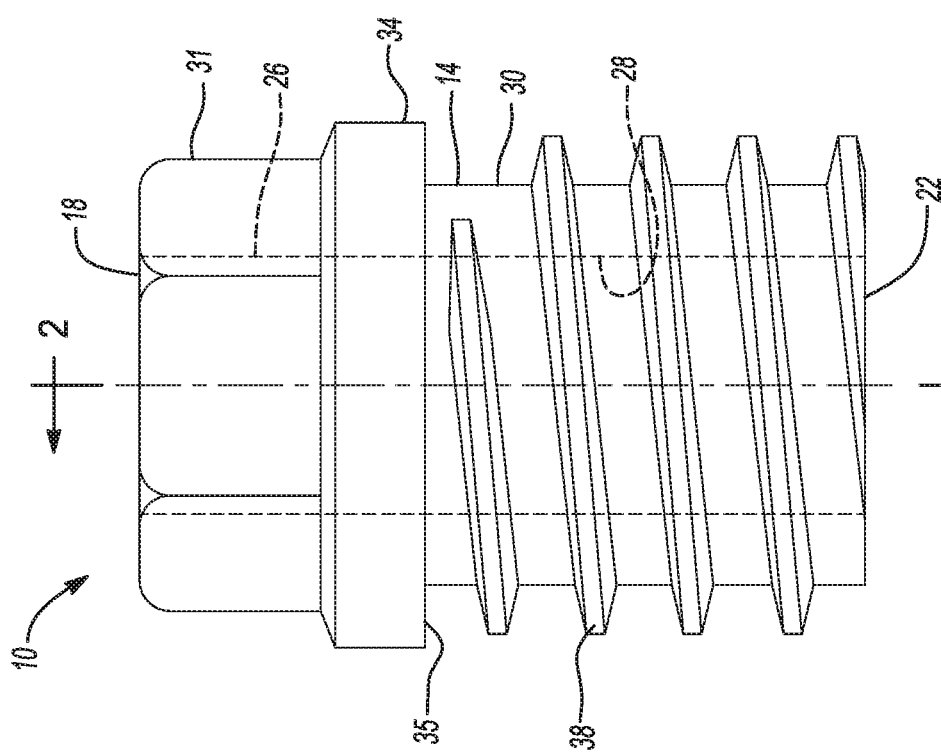
FIG. 1 is a side view of a compression limiter in accordance with one embodiment of the present disclosure.

Referring to FIG. 1, a compression limiter 10 comprises a body 14 having a first end 18 extending to a second end 22. As shown, body 14 has a bore 26 formed through the first and second ends 18, 22, defining an inner wall 28 and a longitudinal axis X about which inner wall is disposed. As depicted in FIG. 1, body 14 comprises an outer wall 30 extending from first and second ends 18, 22 about longitudinal axis X.

As shown, outer wall 30 comprises a first shaped drive 31 formed at one of the first and second ends 18,22. In this embodiment, first shaped drive is formed at first end 18. First shaped drive 31 is configured to allow torque to be applied to the limiter 10. In this embodiment, first shaped drive 31 is a male hex drive. It is to be understood that first shaped drive 31 may be any other suitable shape such as square, square socket, double square socket, triangle, triangle socket, hex socket, pentagon, pentagon socket, or any other suitable shape to allow torque to be applied to limiter 10.

In another embodiment, inner wall 28 comprises a second shaped drive 32 formed at one of the first and second ends 18,22 allowing torque to be applied to the limiter 10. In this embodiment, the second shaped drive 32 is formed of a female hex drive or hex socket. It is to be understood that second shaped drive 32 may be any other suitable shape such as square socket, double square socket, triangle, triangle socket, pentagon socket, or any other suitable shape to allow torque to be applied to limiter 10.

Figure 2:
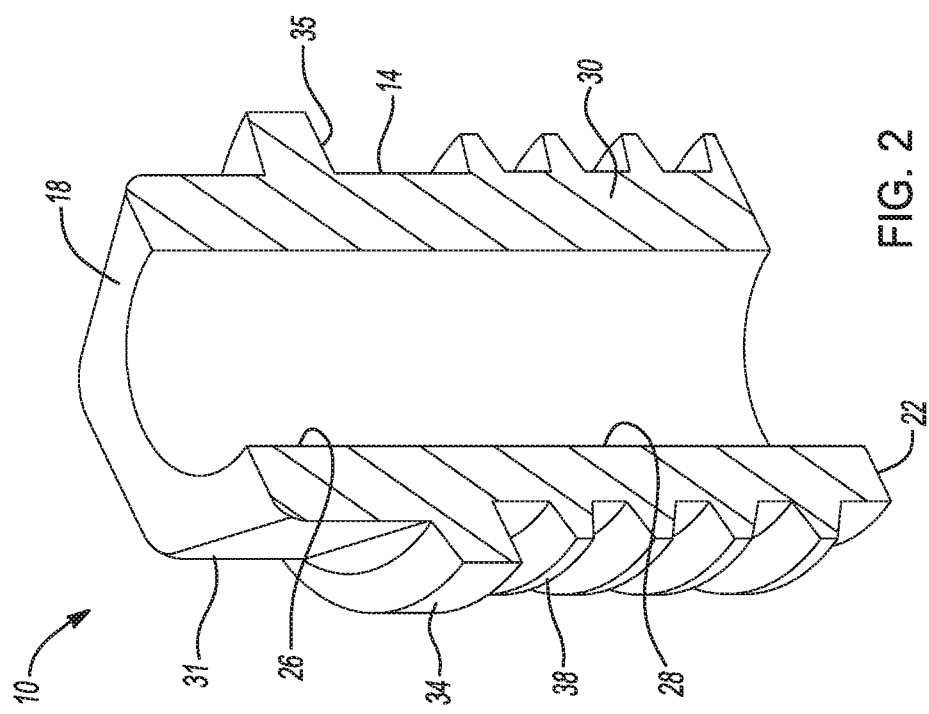
FIG. 2 is a cross-sectional view of the compression limiter in FIG. 1, taken along lines 2-2.

As shown in FIGS. 1-2, outer wall 30 further comprises a shoulder 34 radially extending from the outer wall 30 to a contact portion 35 configured to contact the structure of the automotive vehicle. The body further has an outer wall having a shoulder radially extending from the outer wall to a contact portion configured to contact the first side of the structure. In this embodiment, shoulder 34 is disposed at first shaped drive 31 and extends longitudinally therefrom. Shoulder 34 is configured to reduce tolerance when interfacing and connecting the structure to the vehicle (discussed below).

Moreover, outer wall 30 further comprises a threaded portion 38 formed about longitudinal axis X. As depicted in FIGS. 1-2, threaded portion 38 is disposed on outer wall 30. As shown, threaded portion extends longitudinally from shoulder 34 along longitudinal axis X.

FIGS. 1-2 depict threaded portion 38 extending from shoulder 34 to second end 22 along a length of outer wall 30. However, it is understood that threaded portion 38 may extend any length or along any portion of outer wall 30 without departing from the spirit of the present disclosure. For example, threaded portion may extend any length between should 34 and second end 22. As will be discussed in greater detail below, threaded portion 38 is matingly cooperable with an automotive structure to provide a positive lock interface between the limiter 10 and the structure.

Limiter 10 may be made of any suitable material such as a metal or metal alloy. For example, limiter 10 may be made of steel, aluminum, stainless steel, alloy steel, galvanized steel, tool steel, brass, bronze, copper, alloys thereof, or any other suitable material.

Figure 3:
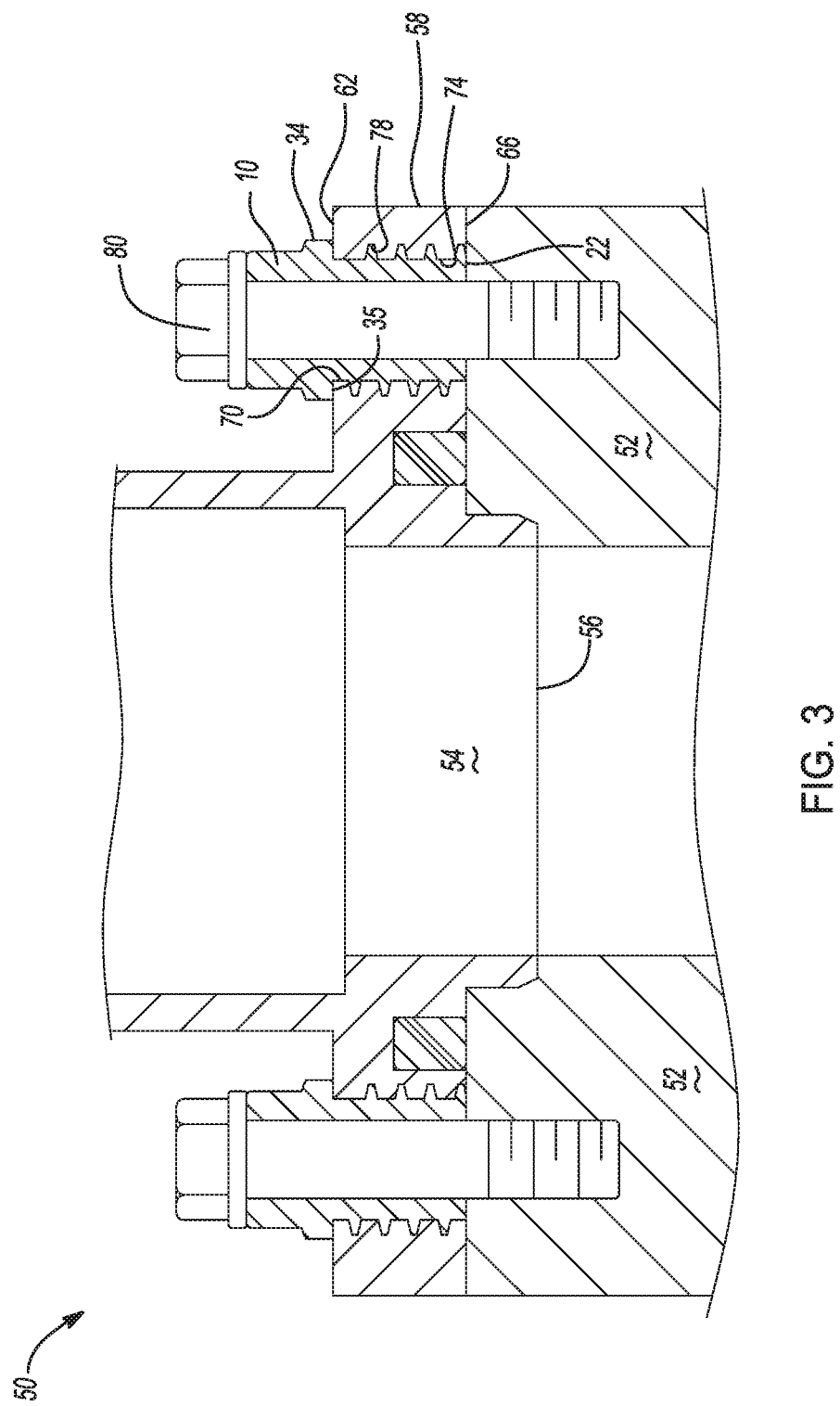
FIG. 3 is a cross-sectional view of an automotive assembly of a structure with the compression limiter of FIG. 1 in accordance with one embodiment of the present disclosure.

As shown in FIG. 3, an automotive assembly 50 includes compression limiter 10 which is configured to interface automotive assembly 50 with a portion of a motor vehicle 52, e.g., a cylinder head. As depicted, automotive assembly 50 includes a structure 54 having a base 56 and a flange 58 extending from base 56. In this embodiment, flange 58 includes a first side 62 and an opposing second side 66. Moreover, flange 58 has a first bore 70 formed through the first and second sides 62, 66 defining an internal wall 74. As shown, internal wall 74 has internal threads 78 formed thereon. In this embodiment, threaded portion 38 of outer wall 30 and internal threads 78 of internal wall 74 are matingly cooperable to provide a positive lock interface between the limiter and the structure.

As shown, as internal threads 78 and threaded portion 38 are matingly connected, body 14 is in contact with structure 54 and second end 22 is in contact with motor vehicle 52. As such, contact portion 35 of shoulder 34 of body 14 is in contact with first side 62 of flange 58, providing a positive lock interface between limiter 10 and structure 54. Moreover, a bolt 80 is disposed through bore 26 of body 14 and to vehicle 52 to secure structure 54 to vehicle 52.

Compression limiter 10 provides an improved interface connection between structure 54 and vehicle 52. As structure 54 may be comprised of plastic or polymeric material and vehicle 52 may be comprised of metal or metal alloy, the interface provided by limiter 10 reduces system tolerances of assembly 50. Packaging space may also be reduced. The mating connection of threaded portion 38 and internal threads 78 along body 14 enhances bolt clamp retention and maintains bolt clamp load transfer between structure 54 and vehicle 52. In turn, limiter 10 also minimizes plastic deformation of structure 54 and reduces gravity loading. Furthermore, tool damage is reduced.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A self-tapping compression limiter for a structure of an automotive vehicle, the limiter comprising:
   a body having a first end extending to a second end, the body having a bore formed through the first and second ends defining a longitudinal axis, the body having an outer wall having a shoulder radially extending from the outer wall to a contact portion configured to contact the structure, the shoulder being formed adjacent the first end to reduce tolerance to the structure, the second end being in contact with the vehicle, the outer wall having a threaded portion formed about the longitudinal axis, the threaded portion being matingly cooperable with the structure to provide a positive lock interface between the limiter and the structure; and a bolt disposed through the bore of the body and to the vehicle to secure the structure to the vehicle.

2. The limiter of claim 1 wherein the inner wall comprises a shaped drive formed at one of the first and second ends allowing torque to be applied to the limiter.

3. The limiter of claim 2 wherein the shaped drive is a female hex drive.

4. The limiter of claim 1 wherein the outer wall comprises a shaped drive formed at one of the first and second ends allowing torque to be applied to the limiter.

5. The limiter of claim 4 wherein the shaped drive is a male hex drive.

6. The limiter of claim 1 wherein the body comprises steel, aluminum, brass, bronze, copper, or alloys thereof.

7. An automotive assembly with self-tapping compression limiter, the assembly comprising:

a structure having a flange with a first side and an opposing second side, the flange having a first bore formed through the first and second sides defining an internal wall having internal threads formed thereon; and a limiter having a body, the body having a first end extending to a second end, the body having a second bore formed through the first and second ends defining a longitudinal axis, the body having an outer wall having a shoulder radially extending from the outer wall to a contact portion configured to contact the first side of the structure, the shoulder being formed adjacent the first end to reduce tolerance to the structure, the second end being in contact with the vehicle, the outer wall having a threaded portion formed about the longitudinal axis, the threaded portion of the outer wall and the internal threads of the internal wall being matingly cooperable to provide a positive lock interface between the limiter and the structure; and a bolt disposed through the second bore of the body and to the vehicle to secure the structure to the vehicle.

8. The assembly of claim 7 wherein the inner wall comprises a shaped drive formed at one of the first and second ends to allow torque to be applied to the limiter.

9. The assembly of claim 7 wherein the shaped drive is a female hex drive.

10. The assembly of claim 9 wherein the outer wall comprises a shaped drive formed at one of the first end and second end to allow torque to be applied to the limiter.

11. The assembly of claim 10 wherein the shaped drive is a male hex drive.

12. The assembly of claim 7 wherein the internal wall comprises an internal diameter and the shoulder comprises an outer diameter greater than the internal diameter.

13. The assembly of claim 7 wherein the body comprises steel, aluminum, brass, bronze, copper, or alloys thereof.

14. A vehicle having an automotive assembly with self-tapping compression limiter, the vehicle comprising:

a chassis;

a body supported by the chassis, the body including a motor compartment and an occupant zone; and an automotive assembly with self-tapping compression limiter disposed in the motor compartment, the assembly comprising:

a structure having a flange with a first side and an opposing second side, the flange having a first bore formed through the first and second sides defining an internal wall having internal threads formed thereon;

a limiter having a body, the body having a first end extending to a second end, the body having a second bore formed through the first and second ends defining a longitudinal axis, the body having an outer wall having a shoulder radially extending from the outer wall to a contact portion, the shoulder being formed adjacent the first end to interface with one of the first and second sides of the flange for reduced tolerance to the structure, the second end being in contact with the vehicle, the outer wall having a threaded portion formed about the longitudinal axis, the threaded portion of the outer wall and the internal threads of the internal wall being matingly cooperable to provide a positive lock interface between the limiter and the structure; and a bolt disposed through the second bore of the body and to the vehicle to secure the structure to the vehicle.

15. The vehicle of claim 14 wherein the inner wall comprises a shaped drive formed at one of the first end and second end to allow torque to be applied to the limiter.

16. The vehicle of claim 15 wherein the shaped drive is a female hex drive.

17. The vehicle of claim 14 wherein the outer wall comprises a shaped drive formed at one of the first end and second end to allow torque to be applied to the limiter.

18. The vehicle of claim 17 wherein the shaped drive is a male hex drive.

19. The vehicle of claim 14 wherein the internal wall comprises an internal diameter and the shoulder having an outer diameter greater than the internal diameter.

20. The vehicle of claim 14 wherein the body comprises steel, aluminum, brass, bronze, copper, or alloys thereof.

* * * * *